United States Patent
Bunton et al.

(10) Patent No.: US 6,175,882 B1
(45) Date of Patent: Jan. 16, 2001

(54) NETWORK SYSTEM FOR A FIRST MODULE PORT AUTO CONFIGURING SAME MODE AS A SECOND MODULE PORT

(75) Inventors: William P. Bunton, Pflugerville; David A. Brown, Austin; John C. Krause, Georgetown; Charles E. Peet, Jr., Austin, all of TX (US)

(73) Assignee: Tandem Computers Incorporated, Cupertino, CA (US)

( * ) Notice: Under 35 U.S.C. 154(b), the term of this patent shall be extended for 0 days.

(21) Appl. No.: 09/206,593

(22) Filed: Dec. 7, 1998

(51) Int. Cl.[7] .................................................. G06F 13/00
(52) U.S. Cl. ............................... 710/14; 710/11; 710/14; 327/39
(58) Field of Search ............................... 709/301; 710/11, 710/14, 104, 106; 327/8, 39, 47

(56) References Cited

U.S. PATENT DOCUMENTS

| | | | |
|---|---|---|---|
| 5,561,666 | * 10/1996 | Christenen et al. | 370/276 |
| 5,568,525 | * 10/1996 | Nijs et al. | 375/356 |
| 5,870,566 | * 2/1999 | Joh | 709/251 |
| 5,951,685 | * 9/1999 | Stancil | 713/2 |
| 6,026,078 | * 2/2000 | Smith | 370/258 |
| 6,112,303 | * 8/2000 | Stancil | 713/2 |

FOREIGN PATENT DOCUMENTS

0791881A1 * 8/1997 (EP) ............................... G06F/9/445

* cited by examiner

*Primary Examiner*—Thomas C. Lee
*Assistant Examiner*—Chun Cao
(74) *Attorney, Agent, or Firm*—Townsend and Townsend and Crew LLP

(57) ABSTRACT

A system and technique of auto-configuring a first module to be in the same mode as a second module includes testing the frequency of a clock signal received from the second module to determine its mode of operation. The first module then auto-configures its ports to be in the same state as the second module. Additional test include the number of clock signals and symbol size to detect additional modes of operation. The first module is auto-configured as a result of the tests.

3 Claims, 3 Drawing Sheets

| RxClk1 Frequency | RxClk0 Toggles | RxCD[9] Toggles | Configuration | Notes |
|---|---|---|---|---|
| less than 32 MHz | X | X | Don't configure | Clock too slow |
| Greater than 32 MHz but less than 57 Mhz | No | No | SNet-1 mode 8b/9b encoding single clock single edge | TxClk set to 50 MHz TxClk_125 tri-stated TxData bit cell centered on rising edge of TxClk RxCD sampled on rising edge of RxClk1 |
| | X | Yes | Don't configure | Illegal configuration |
| | Yes | X | Don't configure | Illegal configuration |
| Greater than 57 MHz | No | No | SNet-II mode 8b/9b encoding single clock both edges | TxClk set to 62.5 MHz. TxClk_125 tri-stated. TxData changes twice per clock cycle. even data byte bit cell centered on rising edge of TxClk. odd data byte bit cell centered on falling edge of TxClk. RxData captured on both edges of RxClk(1).even data byte on rising edge. odd data byte on falling edge. |
| Greater than 57 MHz | No | Yes | SNet-II mode 8b/10b encoding single clock both edges | TxClk set to 62.5 MHz. TxClk_125 tri-stated. TxData changes twice per clock cycle. even data byte bit cell centered on rising edge of TxClk. odd data byte bit cell centered on falling edge of TxClk. RxData captured on both edges of RxClk(1).even data byte on rising edge. odd data byte on falling edge. |
| Greater than 57 MHz | Yes | X | SNet-II mode 8b/10b encoding two clock single edge | TxClk tri-stated. TxClk_125 set to 125 MHz. TxData bit cell centered on rising edge of TxClk_125. RxData captured on both RxClk1 and RxClk0. even data symbol on rising edge of RxClk1. odd data symbol on rising edge of RxClk0. |

*FIG. 3.*

NETWORK SYSTEM FOR A FIRST MODULE PORT AUTO CONFIGURING SAME MODE AS A SECOND MODULE PORT

BACKGROUND OF THE INVENTION

Large servers require I/O expansion and the ability do add devices on-line. Expansion is typically very limited in bus-based I/O systems due to loading restrictions that limit the number of controllers on a single segment.

Networks obviate some of these problems assuring that expansion limits are not defined by arbitrary packaging constraints. However, expandability is enhanced if the network is hot-pluggable to allow on-line upgrades and repairs.

If the network has multiple modes of operation than a module being added must be configured in the mode of the modules it is connected. On-line addition or initialization of the module to the network would require that a service technician have knowledge of the modes of operation of the network and the ability to configure the module when it is added to the network.

Often, however, technicians are not sufficiently trained to perform such module configuration or the mode of a particular modules operation is not known. Accordingly, for multi-mode networks hot-pluggability is difficult to implement.

SUMMARY OF THE INVENTION

The present invention is a system and technique for auto-configuring a module added to a network or coming out of reset. According to one aspect of the invention, different modes are characterized by different clock rates. A first module is connected to a second module operating in one of the network modes. The first module compares the clock frequency of a signal received from the second module to a reference frequency to determine the mode of operation of the second module. The first module configures its ports to be in the same mode as the second module.

According to another aspect of the invention, different modes are characterized by first and second symbols of different size (number of bits). The first module detects whether a bit-position only in the larger symbol size is toggling to determine the mode of operation of the second module. The first module then configures its ports in the same mode as the second module.

According to a further aspect of the invention, different modes are coupled by different numbers of clock signals. The first module detects the number of clock signals to determine the mode of operation of the second module. The first module then configures its ports in the same mode as the second module.

Additional features and advantages of the will be apparent in view of the following detailed description and appended drawings.

BRIEF DESCRIPTION OF THE DRAWINGS

FIG. 3 is a table depicting the different configuration tests.

DESCRIPTION OF THE SPECIFIC EMBODIMENTS

A preferred embodiment of the invention will now be described in the context of an auto-configuration logic in the common code SNet-II stack used in SNet-II ports. SNet I and Snet II are scalable networks that support read, write, and interrupt semantics similar to previous generations I/O busses and are manufactured and distributed by the assignee of the present invention.

The SNet-II MAC (media access) and LLP (link-layer protocol) stacks are verilog common code modules that are used in ASICs that support SNet-II. The SNet-II stack can operate in the following four configurations:

1. SNet-I mode (8bit/9bit encoding, 50 MB/s data rate, one clock)
2. SNet-II 9 bit mode (8bit/9bit encoding, 125 MB/s data rate, one clock)
3. SNet-II 10 bit mode (8bit/10bit encoding, 125 MB/s data rate, one clock)
4. SNet-II 10 bit mode (8bit/10bit encoding, 125 MB/s data rate, two clocks) SNet II physical links are designed to directly drive standard 8bit/9bit serializer/deserializer (SERDES) components to interface to standard 100BaseX cabling. A SERDES chip requires two clocks and is configuration number 4 above. Configuration 1 is compatible with ServerNet I.

Auto configuration logic in the SNet-II stack detects which of the above four configurations the port is connected to and configures the port appropriately.

Figure 1:
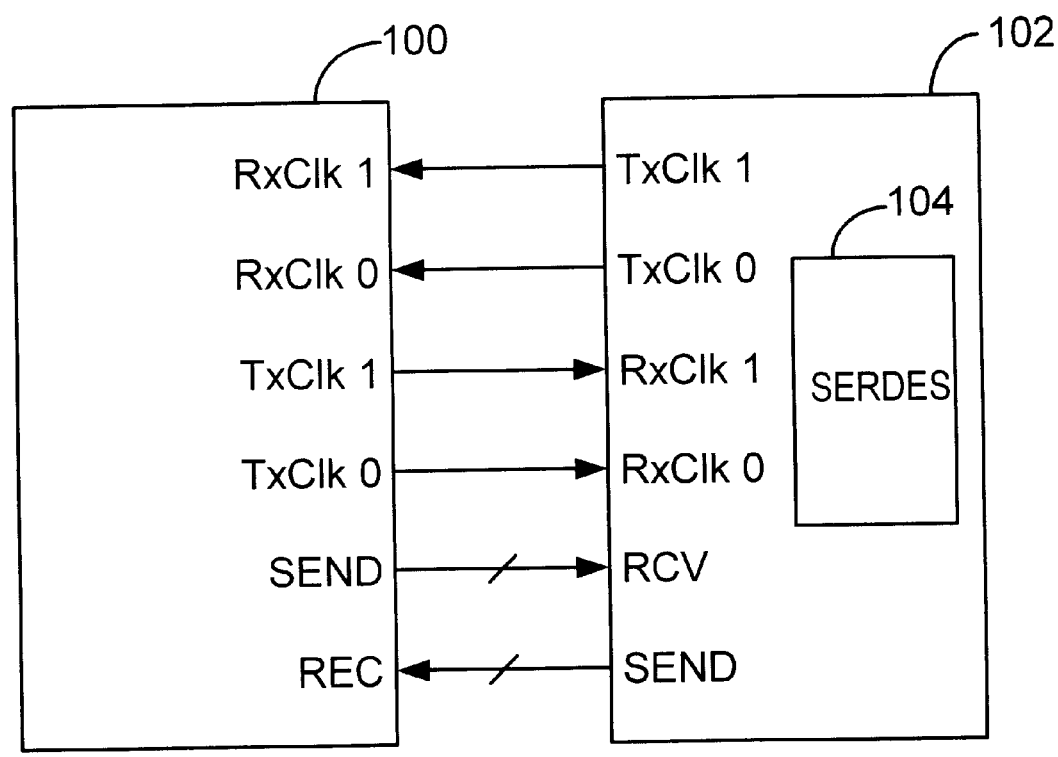
FIG. 1 is a block diagram of interconnected first and second modules.

The basics of Auto-configuration in the presently defined embodiment will now be described with reference to FIG. 1. In FIG. 1 a router chip 100 is coupled to an option board 102 including a SERDES chip 104. This is just one of many possible port connections but will serve to illustrate an embodiment of the auto-configuration logic. FIG. 1 depicts the TxClk0 and TxClk1 pins of each chip respectively coupled to RxClk0 and RxClk1 pins of the other chip. Additionally send and receive buses 106 and 108 coupled the router chip 100 to the option board 102. In the following it is assumed that the router chip has come out of reset and must be configured.

As will be apparent from the following, the router chip 100 must determine the configuration of the output port on the option board 102 to configure its input port to receive data from the option board and router 100 must configure its output port to be in the same configuration of the input port of the option board.

When a port comes out of reset, the first thing that it does is attempt to determine what it is connected to (this is auto-configuration). Specifically, it is looking for one of the four configurations listed above.

The indicators that the logic uses to perform this are:
Clock toggling and rate (vs. core clock) on RxClk1 pin
Clock toggling on RxClk0 pin (indicates SERDES chip)
RxCD[9] toggling (only used in 10-bit encoding)
FIG. 2 shows the state diagram for the auto-configuration logic.

Figure 2:
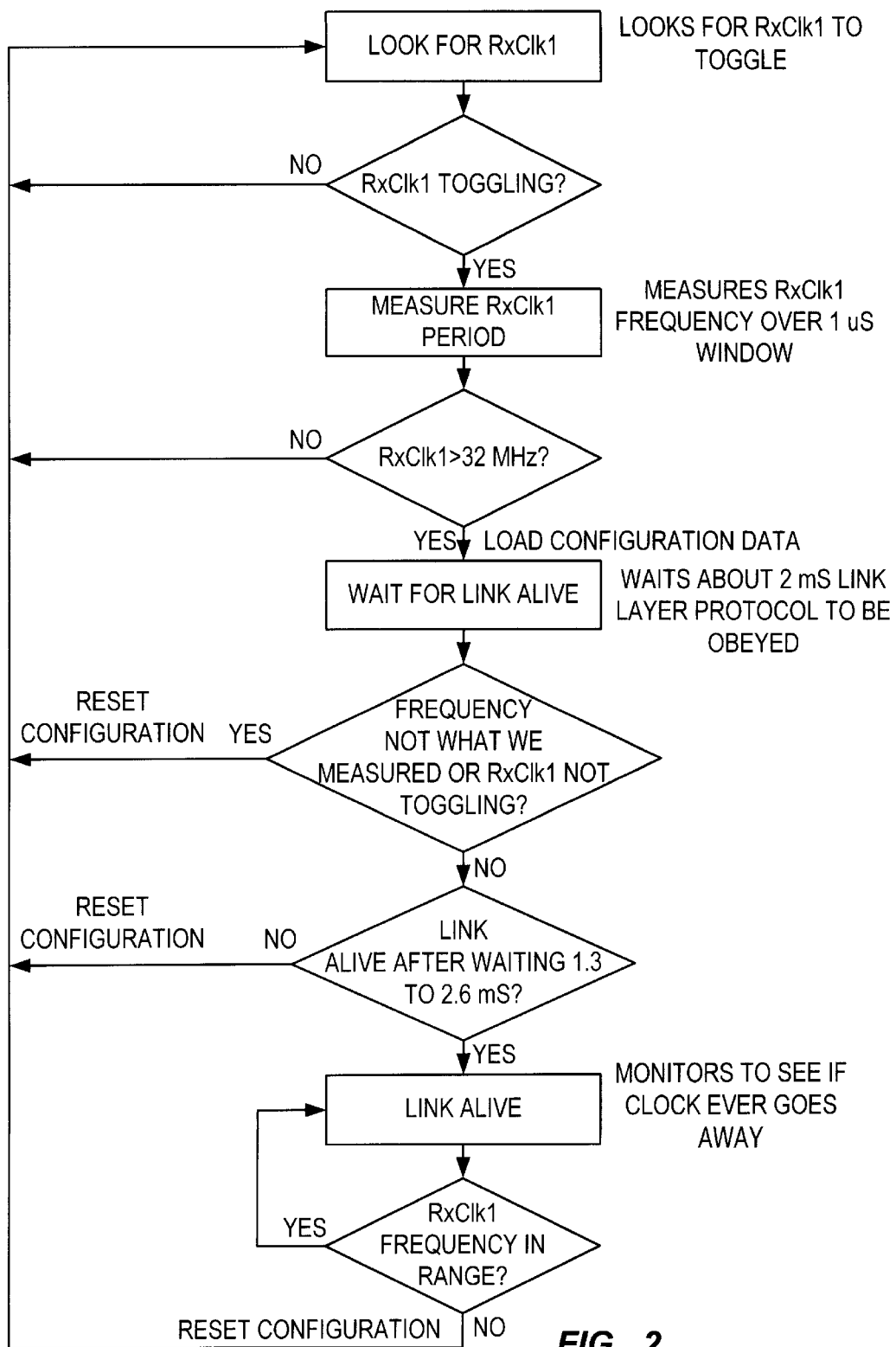
FIG. 2 is a flow chart of an auto-configuration procedure.

In FIG. 2, the four main states of the logic perform the following functions:

Look for RxClk1—RxClk1 is checked to see if it is toggling. If it is, than the logic transitions to the "Measure RxClk1 Period" state. If it isn't, the logic stays in this state waiting for the clock to toggle. While in this state, the transmit port is configured to perform 10bit encoding, both TxClks are enabled, and TxClK is set at 62.5 MHz.

Measure RxClk1 Period—the frequency of RxClk1 is measured to determine if it is 50 MHz (SNet-I mode) or 62.5 MHz (SNet-II mode). If the clock frequency is less that 32MHz, the logic returns to the "Look for RxClk1" state.

The rules for configuration are listed below and summarized in the table of FIG. 3. If the auto-configuration logic determines an illegal mode, the logic returns to the "Look for RxClk1" state. While in the "Measure RxClk1 Period" state, the transmitter is configured to perform 10b encoding, both TxClks are enabled, and TxClk is set at 62.5 MHz.

1. If RxClk1 is greater than 57 Mhz, it is assumed to be 62.5 MHz and the link is configured as a SNet-II link (125 MB/sec). This sets the frequency of the TxClk output to 62.5 MHz. The frequency of TxClk$_{13}$ 125 is always 125 MHz.

Note that only one transmit clock is enabled, depending on if the port configures in two-clock mode or not.

2. If RxClk1 is less than 57 MHz, it is assumed to be 50 MHz and the link is configured as a SNet-I link. This sets the frequency of the TxClk output to 50 MHz. If either RxClk0 or RxCD[9] toggles and RxClk1 is less than 57 MHz, this is an illegal configuration and the configuration process starts from scratch. The RxCD data is captured on the rising edge of RxClk1 to be captured on the falling edge of RxClk1 requires the port to be over-ridden and configured to capture data on the falling edge of the clock 3. If RxClk0 is transitioning, then the port is configured to two clock mode and 10-bit mode (basically configured to operate with the SERDES chip). This tri-states TxClk.

4. If RxClk0 is not transitioning, then the port is configured to single clock mode. This tri-states TxClk$_{13}$ 125.

5. If RxCD[9] toggles, then the port is configured in 10-bit mode.

6. Wait for Link Alive—The logic waits between 1.3 and 2.6 mS for the link to be come alive (normally takes between 16 uS to 40 uS, depending on the symbol rate). While in this state, the transmitter is configured as determined at the end of the "Measure RxClk1 Period" state—it drives only one of the transmit clocks (TxClk or TxClk$_{13}$ 125) and performs either 9b or 10 bit encoding. If the link does not come alive in the 1.3 to 2.6 mS time period, if the frequency of the RxClk1 clock drops below 32 MHz, or if the frequency of RxClk1 deviates from what was measured in the "Measure RxClk1 Period" state, the logic returns to the "Look for RxClk1 " state. If the link comes alive, the logic transitions to the "Link Alive" state.

7. Link Alive—The logic stays in this state unless the frequency of the RxClk1 clock drops below 33 MHz, in which case the logic returns to the "Look for RxClk1 " state. While in this state, the transmitter is configured as determined at the end of the "Measure RxClk1 Period" state—it drives only one of the transmit clocks (TxClk or TxClk$_{13}$ 125) and performs either 9bit or 10 bit encoding. Basically, if a valid link-alive sequence is detected with the current set of auto-configuration parameters, we stay with them until the clock goes away.

In the preferred embodiment a provision has been made in the programming model to override the auto-configuration logic. This was done for two reasons:

1. The SNet port is in a special mode that the auto-configuration logic does not support. The main case where this is needed is in SNet-I mode in an application that has an external delay line on RxClk. In this case, the data needs to be captured on the falling edge of RxClk1.

2. There is an error in the auto-configuration logic that keeps it from working in some or all configurations. This will provide a way to configure SNet ports via software control. This is a fallback position used for risk reduction. There currently is no software that performs this function (determining what types of SNet devices are connected to each other on a given SNet link and configuring the devices to the same mode). If the auto-configuration logic for a port is overridden, the auto-configuration state machine shown in FIG. 1 is bypassed.

The invention has now been described with reference to the preferred embodiments. Alternatives and substitutions will now be apparent to persons of skill in the art. In particular, although the invention has been described as embodied in the SNet II system the principles apply to any network having multiple configurations characterized by different clock rates, symbol size, or number of clock signals. Further, the particular frequencies and symbol sizes described are not critical to the practice of the invention. Accordingly, it is not intended to limit the invention except as provided by the appended claims.

What is claimed is:

1. In a network including modules having transmit/receive ports of a first module coupled to receive/transmit ports of a second module and with the ports being configured in one of a plurality of port modes, with said port modes characterized by variable clock rates, and with a first port mode being a highest performance port mode having the highest clock rate and the maximum number of symbol bits, a mechanism for auto-configuring a receive/transmit port of a first module coupled to a transmit/receive port of a second module to auto-configure the receive/transmit ports of the first module in the same port mode of the second module, with the second module transmit port transmitting clock signals at a rate determined by its port mode, with the second module transmit/receive port being in either said high performance port mode or a low performance port mode, with the low performance port mode having a lower clock speed than said high performance port mode, said system comprising:

a first receive pin coupled to receive a first clock signal output by said second module;

an auto-configuration state machine configured to:
detect if a clock signal having a clock rate greater than a first test frequency is received on said receive pin, with the first test frequency having a clock rate less than the clock rate of either said high performance or low performance port mode
if not, resetting the transmit/receive port of the first module because a legal port mode has not been detected;
if yes, auto-configure said receive-transmit port of said first module in said high performance port mode;
subsequent to detecting, comparing a detected clock frequency to a second test frequency having a magnitude between the clock rates of said high performance and low performance port modes;
if the detected frequency is less than the second test frequency, auto-configure the receive/transmit port of said second module in said low performance port mode.

2. The system of claim 1 where a port can additionally be configured in a medium performance port mode having the same clock rate as said high performance port mode but transmitting symbols having fewer symbol bits than said high-performance mode, said system further comprising:

a most significant data symbol bit pin coupled to receive the most significant data symbol bit output by the transmit port of said second module when said the ports of said second module are configured in the high performance mode;

and wherein said auto-configuration state machine is further configured to:

if the detected frequency is greater than the clock rate of the low performance port mode, testing if a signal is toggling on said most significant data symbol bit pin:
if yes, remaining in the high-performance port mode;
if no, auto-configuring the receive/transmit port of the first module in said medium performance mode because testing the most significant data symbol pin indicates that the symbols being transmitted have fewer symbol bits than symbols transmitted by the high performance port mode.

3. The system of claim 1 where a port can additionally be configured in a serializer/deserializer port mode having first and second clock signals, said system further comprising:

a second receive pin coupled to receive a second clock signal output by said second module;

and wherein said state machine is further configured to:
auto-configure the receive/transmit port of said first module to said serializer/deserializer port mode.

* * * * *

UNITED STATES PATENT AND TRADEMARK OFFICE
CERTIFICATE OF CORRECTION

PATENT NO. : 6,175,882

DATED : January 16, 2001

INVENTOR(S) : Bunton, et al.

It is certified that error appears in the above-identified patent and that said Letters Patent is hereby corrected as shown below:

In the claims, column 4, line 50, should read:
-- if yes, auto-configure said receive/transmit port of said --

Signed and Sealed this

Fifteenth Day of May, 2001

Attest:

NICHOLAS P. GODICI

Attesting Officer     Acting Director of the United States Patent and Trademark Office